June 5, 1962 J. P. OLIVER 3,037,929
BLADE ELECTRODE ASSEMBLY
Original Filed Sept. 22, 1958 2 Sheets-Sheet 1
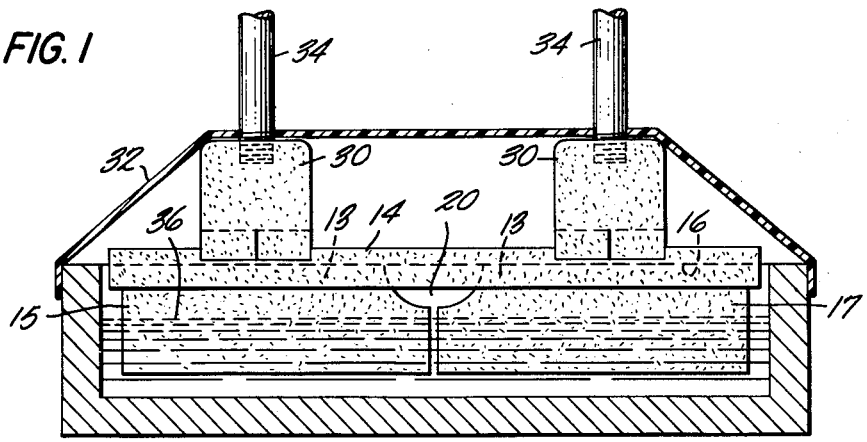
FIG. 1
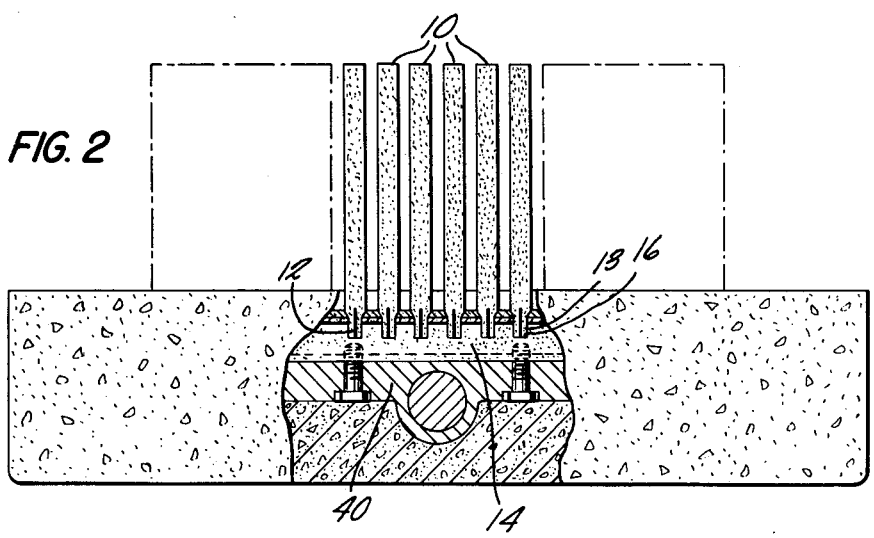
FIG. 2
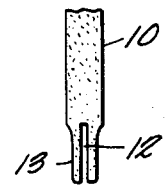
FIG. 3
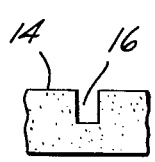
INVENTOR
JOHN P. OLIVER
BY Richard S. Shrese
ATTORNEY June 5, 1962  J. P. OLIVER  3,037,929
BLADE ELECTRODE ASSEMBLY
Original Filed Sept. 22, 1958  2 Sheets-Sheet 2

INVENTOR
JOHN P. OLIVER
BY
Richard S. Shreve Jr.
ATTORNEY

United States Patent Office 3,037,929
Patented June 5, 1962

3,037,929
BLADE ELECTRODE ASSEMBLY
John P. Oliver, Berea, Ohio, assignor to Union Carbide Corporation, a corporation of New York
Original application Sept. 22, 1958, Ser. No. 762,338, now Patent No. 2,967,142, dated Jan. 3, 1961. Divided and this application Oct. 20, 1960, Ser. No. 71,112
1 Claim. (Cl. 204—288)

This invention relates to blade electrode assemblies, and more particularly to electrodes of carbon composition such as carbon or graphite for an electrolytic cell.

In a flowing-mercury cathode type electrolytic cell of which the De Nora cell is an example, an anode plate of carbon or graphite is positioned horizontally in an electrolyte over a flowing-mercury cathode, and electrical current is carried to the anode and the anode supported in the cell by means of a carbon or graphite riser rod. Usually, more than one anode plate is used in the cell, but in any event, the anode plates are completely submerged in electrolyte and extend nearly over the entire cross section of the cell. As a consequence, very little egress is had for the escape and recover of gases from the cell, such as the product chlorine gas, and gas escape is usually possible only between the edges of the anodes. The gases form bubbles in the electrolyte which collect at the bottom of the anodes and reduce their surface area accessible to the reaction within the cell. Thus, due to the prolonged path the gases must follow to be recovered, the efficiency of a cell may be lessened.

It has been discovered that the difficulties with horizontal anodes in such a cell may be circumvented by using a plurality of vertical anodes or, as more descriptively called, anode blades suspended in the electrolyte. The ends of these anode blades are usually suspended from the cover of the cell and since only a small cross section of the cell is taken up by the anodes, the gases may readily escape from the electrolyte and cell without being entrapped. This type anode has proven successful and has increased the efficiency of a cell.

One problem, however, has been the design of a practicable assembly for attaching the anodes within a cell such as to the cell cover. It has been found desirable to have the anodes readily attachable and detachable by hand so that the anodes may be removed and replaced in the shortest time possible and without expensive overhaul of the cell. Any joint made by the anodes must be of low resistance or the efficiency of the anodes is lessened. In addition, corrosion is always a problem so that metal parts cannot be used, and the material selected must necessarily be a good conductor of electricity.

According to this invention, there is provided an electrode assembly for an electrolytic cell by which blade type electrode, such as an anode, may be easily attached within a cell and which provides an expedient means for the detachment and removal of electrodes from the cell. The electrode assembly of the invention comprises a plurality of carbon or graphite electrode blades or plates detachably fitted to a carbon or graphite header, such header being adapted to be attached within a cell, such as to the cover of a cell, and to suspend the plurality of electrodes vertically within the electrolyte of the cell.

In the drawings:

FIG. 1 is a vertical section through a De Nora type chlorine cell having a preferred embodiment of the present invention installed therein;

FIG. 2 is a vertical section through a Hooker type chlorine cell with a similar installation;

FIG. 3 is an exploded view of the quick-detachable spring fit joint employed in FIGS. 1 and 2;

Figure 4:
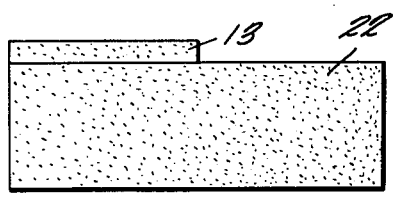
FIG. 4 is an elevation of a modified plate.

The preferred embodiment of the electrode assembly of an electrode blade and header, according to the invention, for use in an electrolytic cell is best shown in FIG. 3. The electrode blade 10 is a carbon or graphite plate suitably molded or otherwise shaped to form a marginal tongue 13 having a slot 12 cut or machined along its length to form a spring fit joint with a header 14. The header 14 is a flat carbon or graphite plate with grooves 16 machined therein to receive in spring fit relation the slotted tongues 13 of the electrode blades 10.

The tongues 13 are slotted, as described, to make these tongues yieldable when sprung into the header grooves 16, and the sides of the tongues are suitably machined to a close tolerance with the grooves 16, a tolerance of about ±0.100 being about the greatest permissible. This is important because the resistance of the joint must be maintained as low as possible while yet permitting assembly and disassembly by hand.

In one example of the invention, an anode assembly constructed as herein described, was used in a De Nora type chlorine cell. As shown in FIG. 1, the new anode assembly for this cell comprises carbon or graphite riser rods, usually a pair of rods 30, as shown, positioned suitably with relation to the cover 32 of the cell. A pair of copper rods 34 extend beyond the cell to a current source, not shown, for carrying current to the riser rods and the header 14 fitted to the rods 30.

The header 14 carries a plurality of anode blades 15 and 17 and spaced in end-to-end relation. These blades are provided with the tongues 13 and slots 12 shown in FIG. 1. A passage 20 is formed by the blade ends through which the gases may pass in addition to along the sides of the electrodes. This assembly allows a better egress for gases and is preferred in most type cells.

As contrasted with heretofore De Nora cell designs, the level of the electrolyte in the cell was maintained below the header 14, as at 36, and the anodes 15 and 17 were suspended within the electrolyte instead of being completely submerged. This allowed the gases to pass from the electrolyte freely and to be readily recovered from the cell. In addition, only a negligible accumulation of gas bubbles in the electrolyte around the anodes occurred. It was found when the cell was put in operation that a reduction of slightly over 0.1 volt resulted which represents a savings per year per cell of over 200 dollars for a normal rate of chlorine production per cell per day of 1.3 tons. On a basis of 100 tons of chlorine produced per day plant, this represents a savings of over $16,000 per year. After the cell had been operated for a period equal to the useful life of the anodes, it was found that the anode blades could be removed from the cell and new anodes replaced in only a matter of a few minutes which greatly reduced the normal overhaul period required for each cell.

In another example, an anode assembly of the invention was used in the Hooker type chlorine cell. In this cell, heretofore, a plurality of carbon or graphite anode plates were vertically positioned in the cell and spaced between a plurality of cathodes, usually asbestos covered wire formed cathodes, and the electrodes submerged in an electrolyte. The anodes were cast in lead at the bottom of the cell and extended upwardly making electrical contact through the lead base in the cell. Necessarily, since the anodes were cast in lead, when replacing worn and used anodes, the whole cell had to be overhauled, the anodes removed, and new anodes cast in lead at the bottom of the cell. Of course, this was time consuming and costly.

Referring to FIG. 2, there is shown the anode assembly of the invention, as may be used in the Hooker cell. In the assembly, the header 14 is cast in lead 40 at the bottom of the cell and a plurality of anode blades 10 are joined to the header in interference-fit relation, as described herein. The anodes 10 extend upwardly in the cell as was the case before, but may be assembled and disassembled easily by hand from the header without requiring overhaul and recasting of the lead base of the cell.

Figure 5:
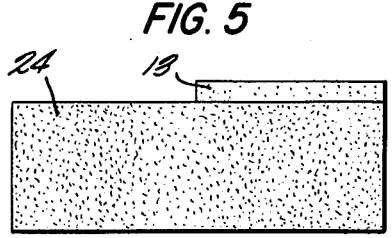
FIG. 5 is an elevation of a corresponding left hand plate.
Figure 6:
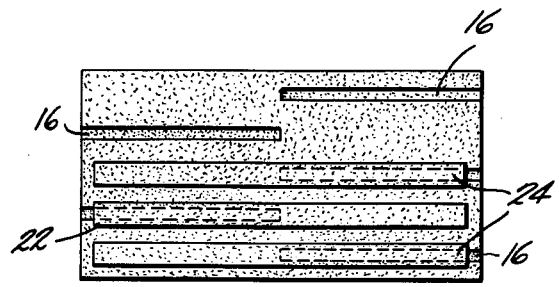
FIG. 6 is a plan of the header for plates of FIGS. 4 and 5.

FIGS. 4, 5, and 6 show another modification which may be used when the electrodes are made thin and spaced close together to provide a greater anode area in a cell. In this assembly, the electrode blades 22 and 24 extend along the full length of the header, but their tongues 13 extend only half such length, and are fitted in grooves 16 of the header alternately on each half of the header. The advantage of this assembly is that the header is not weakened by the number of grooves cut, since the grooves must be placed close together.

Figure 7:
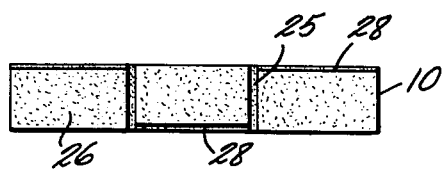
FIG. 7 is a plan of a further modified plate.
Figure 9:
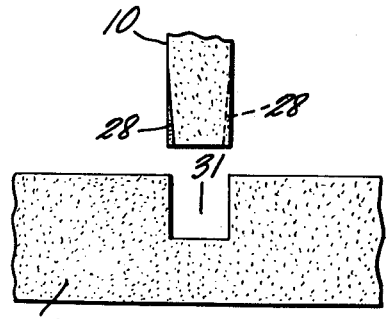
FIG. 9 is a section through a header receiving the plate of FIG. 8.
Figure 8:
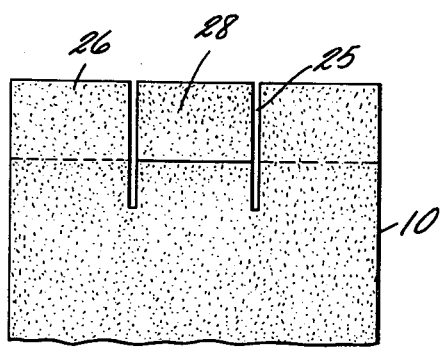
FIG. 8 is a front elevation of FIG. 7.

A further modification of the invention is shown in FIGS. 7, 8, and 9. The anode blade 10 of carbon or graphite has a plurality of slots 25 cut transversely to the length of the blade dividing the blade tongue into substantially equal tenons 26. For example, an anode blade six inches long and one inch thick will have slots cut two inches deep. A side of each alternate tenon 26 is desurfaced, as at 28, to remove material from the side of the tenon to more than half of the depth of the slots 25. For a one inch thick anode blade, the side 28 should be cut to within 0.002 inch to 0.010 inch, but may be more for thicker blades.

The header 29, shown in FIG. 9, is preferably carbon or graphite, but may be other material such as metal when corrosion is not a problem. The header 29 has cut therein a plurality of slots 31 for receiving in spring fit relation the slotted ends of the anode blades 10. The slots 31 are of the same or slightly less width than the width of the blade, a slight undersize being usually preferred for greater wear of the anode blade upon repeated assembly. As an example for a one inch thick anode blade having an end surfaced to within 0.002 inch to 0.010 inch, the width of the header slots should be no larger than between 0.998 and 0.990 inch.

In some cases, where excessive weight of a suspended anode is not a factor, it is desirable to taper the sides of the slots to provide greater electrical contact surface between the header and the anode blades. For example, a taper of 0.036" per foot has been found to lower the electrical resistance of a joint having a slot width and depth of one inch.

The advantages of the spring joint of the invention for assembling blade type anodes in a cell are: that the anodes may be easily assembled to a header by hand at relatively low applied pressures, the joint is admirably suited to the assembly of thin anodes, excellent gas removal from a cell is possible, economic use of short lengths of carbon or graphite is obtained, easy assembly and disassembly of the anodes from a cell by hand in a very short time is possible, and the headers in the cell, whether attached to the cover or cast in lead at the bottom, are permanent and do not require removal for years.

This is a division of application Serial No. 762,338, filed September 22, 1958, now Patent No. 2,967,142.

What is claimed is:

In an electrolytic cell, a take-apart electrode assembly comprising a header plate of carbon composition, said header plate having parallel uniformly spaced slots therein, an anode plate of carbon composition engaged in each slot of said header plate, the end of each anode plate which is engaged in the corresponding slot in said header plate being slightly wider than said slot in the disassembled condition and having uniformly spaced kerfs provided therein which are transverse to the length of said anode plate thereby forming equal tenons in said anode plate, alternate sides of successive tenons being desurfaced to remove material from the side of the tenon to more than half of the depth of said kerfs, which permits alternate tenons to be sprung inwardly in opposite directions and enter said slots in said carbon header plate so as to be readily manually inserted therein with a spring fit forming a low electrical resistance current-carrying carbon-to-carbon joint, and to be readily manually detached therefrom.

References Cited in the file of this patent
UNITED STATES PATENTS

| | | |
|---|---|---|
| 2,511,686 | Andre | June 13, 1950 |
| 2,617,762 | Basileusky | Nov. 11, 1952 |
| 2,868,712 | Deprez | Jan. 13, 1959 |